US005801685A

United States Patent [19]
Miller et al.

[11] Patent Number: 5,801,685
[45] Date of Patent: Sep. 1, 1998

[54] AUTOMATIC EDITING OF RECORDED VIDEO ELEMENTS SYCHRONIZED WITH A SCRIPT TEXT READ OR DISPLAYED

[75] Inventors: Robert E. Miller, Monona; Randall T. Wiggins, Madison; Daniel P. Desjardins, Middleton, all of Wis.

[73] Assignee: Tektronix, Inc., Wilsonville, Oreg.

[21] Appl. No.: 629,034

[22] Filed: Apr. 8, 1996

[51] Int. Cl.$^6$ .................................................. G06F 17/20
[52] U.S. Cl. ................................................................. 345/302
[58] Field of Search ............................... 395/806–807, 395/326; 345/302

[56] References Cited

U.S. PATENT DOCUMENTS

| | | | |
|---|---|---|---|
| 4,100,607 | 7/1978 | Skinner | 386/59 |
| 4,122,500 | 10/1978 | Bradford et al. | 360/13 |
| 4,249,218 | 2/1981 | Davis et al. | 386/13 |
| 4,272,790 | 6/1981 | Bates | 386/52 |
| 4,428,001 | 1/1984 | Yamamura et al. | 386/64 |
| 4,491,879 | 1/1985 | Fine | 386/96 |
| 4,528,600 | 7/1985 | Ishiguro et al. | 386/59 |
| 4,612,569 | 9/1986 | Ichinose | 348/588 |
| 4,746,994 | 5/1988 | Ettlinger | 360/13 |
| 4,974,178 | 11/1990 | Izeki et al. | 707/516 |
| 5,119,474 | 6/1992 | Beitel et al. | 345/302 |
| 5,148,154 | 9/1992 | MacKay et al. | 345/340 |
| 5,191,645 | 3/1993 | Carlucci et al. | 345/328 |
| 5,218,672 | 6/1993 | Morgan et al. | 345/501 |
| 5,274,758 | 12/1993 | Beitel et al. | 345/302 |
| 5,442,744 | 8/1995 | Piech et al. | 345/302 |
| 5,467,288 | 11/1995 | Fasciano et al. | 345/328 |
| 5,621,877 | 4/1997 | Neumann et al. | 345/326 |
| 5,640,590 | 6/1997 | Luther | 345/302 |
| 5,664,087 | 9/1997 | Tani et al. | 345/473 |

OTHER PUBLICATIONS

Statement of Robert E. Miller dated Aug. 29, 1996.

*Primary Examiner*—Anton Fetting
*Attorney, Agent, or Firm*—Harry C. Engstrom; Francis I. Gray

[57] ABSTRACT

The present invention provides a video editing system that provides dynamic synchronization of recorded video elements of a presentation with a script text that is to be read by an announcer or displayed while the video element is played. The editing system includes a word processor whereby the script text may be created and edited in a text window on the editing system display. Raw video clips, from video sources connected to the editing system, may be selected and previewed in a video window on the editing system display. Selected video clips are linked to the script text by embedding edit link control sequences into the text at selected points. The control sequences in the script text are linked through a link table to edits in an edit decision list (EDL) that define the video clips that are to be synchronized to the script text. A text scanning routine scans the script text and updates the EDL to reflect changes to the script text to maintain synchronization between the script text and linked video clip segments. A completed program may be viewed on the editing system display in a manner showing the synchronization between the video program elements and the script text. The editing system of the present invention may be used as part of a newsroom automation system to prepare news stories for broadcast, wherein the EDL created using the editing system of the present invention is used to generate the video portion of the broadcast with the synchronized text displayed for reading by a news announcer.

37 Claims, 6 Drawing Sheets

AUTOMATIC EDITING OF RECORDED VIDEO ELEMENTS SYCHRONIZED WITH A SCRIPT TEXT READ OR DISPLAYED

FIELD OF THE INVENTION

This invention pertains generally to video, audio, and multimedia editing systems, and more particularly to computer-based non-linear video editing systems.

BACKGROUND OF THE INVENTION

To create a video program, a program editor selects source material to be presented, and determines the timing of scene changes For some video productions, such as live television news broadcasts, the recorded video program is presented simultaneously with the reading of a textual script by an announcer. Thus, in preparing a TV news story, a program news editor selects recorded source material that will be broadcast in coordination with selected portions of the story script being read. The timing of scene changes is thus preferably coordinated with specific points in the script.

To create a TV news story, the editor picks a clip of video source material to be associated with a portion of the script. The location of the source material, usually on video tape, is noted. The starting time for the clip, measured from the beginning of the story, is noted, and the run-time or play-time of the clip, needed to correspond to the duration of the portion of script to be read, is also noted. Multiple source material clips are similarly selected, with their source location, starting time and play-time noted, until a complete video segment, corresponding to the entire story script to be read, is defined. The list of source materials, starting times and play-times, that defines the video segment, is called an edit decision list (EDL). The EDL may be used by a video technician to compile the video portion of the program This is accomplished by copying the selected portions of the source material, in the order and play-time duration defined by the EDL, onto video tape or some other medium for on air broadcast. At air time, the video program is replayed while the story script is read by the news announcer. If the EDL was properly created, the video program and the reading of the story script will be synchronized.

Computer systems have been used to provide tools to assist a video program editor in the creation of an EDL that will result in a closely coordinated recorded video and read text program. For example, computer based script editors are known wherein a program editor may select or mark a portion of the text, and, based on a previously entered announcer reading speed, the computer system will automatically calculate the approximate amount of time required to read that portion of the script. Thus, the play-time duration of a source material clip to be associated with that portion of the text is automatically determined.

In other advanced video editing systems, a computerized database of source material clips is available. As video segments are brought into the newsroom, either on tape or from direct video feeds, a brief description of the clip and its location is logged into the database. The database entry contains relevant information that allows a database query to locate the clip given a partial description. Thus, a video program editor may quickly select a clip to be added to the EDL from the database. The location of the source material clip is automatically added by the computer system to the EDL. The program editor may then mark the portion of the script text to which this clip is to be associated. The computer system will automatically calculate the starting time and the play-time duration of the clip, based on the automatically calculated estimated reading time of the marked text, as described above, and add them to the EDL. Thus, an EDL may be rapidly generated by alternately selecting a source material clip from the database and marking the portion of the script text to which that clip is to be associated. The EDL may then be used in a conventional manner to generate the video program by compiling the source material clips defined by the EDL for on-air playback. This may be accomplished by manually compiling the video clips onto video tape, or may be accomplished automatically by a computer system which reads the EDL and compiles the video segments into a program in digital form from clips which are accessible to the computer system through a digital video server. When the video program is compiled from the EDL, the program editor can view the video story which he has created. The program editor may then edit the video program by recompiling the EDL. Known computer based video program editing systems may thus be used to rapidly associate each entry of the EDL with a particular portion of the program script.

Because of time pressures and market competition, there has been a desire in the broadcast community to move away from tape-based editing systems to digital disk-based non-linear editing systems. It is estimated that in the future standard computer disk-based servers with sufficient data bandwidth (for example, hundreds or thousands of megabytes per second) will be available which will provide real time video and audio streams to dozens, possibly hundreds, of simultaneously operating work stations distributed throughout a facility and, eventually, throughout the world. However, this capability is not presently available. The problem with disk-based video servers is one of scalability. That is, the number of work stations that can simultaneously play, in real time, all of the video and audio data stored on a server without interfering with each other is severely limited. Therefore, a hybrid solution, combining the best of computer-based and tape-based video technology, is currently used for video interchange.

Component serial digital video technology is used as an advance from the tape-based video world toward future entirely computer-based, video as data, systems. In component serial digital video technology, video frames are stored digitally on video tape. Component serial digital makes it possible to use a computer-controlled video cross point to move video and audio data around a production facility in an automated and standards-compatible manner. Currently, this is really the only digital method to exchange video data between equipment from different vendors. Source material can be easily converted from any tape-based video format to serial digital. Component serial digital video technology receives the main benefit of computer-based video data, namely, the ability to make a copy which is indistinguishable from the original. Furthermore, component digital video can be easily converted to and from a compressed form for storage on a disk-based editing video server.

Component serial digital is one of many interchange formats available for connecting video devices. Other interchange formats include component analog YUV (Beta), and composite analog. However, the properties of the interchange format are not relevant with respect to non-linear editing systems which involves the editing of disk-based digitized video.

The recording of digitized video on disk relies on video compression techniques to reduce the storage requirement and the data rates required of the computer system. The Joint Photographic Experts Group (JPEG) system for still image compression is one scheme for encoding and decoding data that is capable of really flexible data reduction. JPEG provides the best trade-off in terms of cost and image quality. Disk-based random access editing can easily be done on the compressed data because each field of video data is compressed without reference to the preceding or following field. JPEG is a "lossy" compression scheme in that what is recovered during decompression is not exactly the original. The JPEG compression ratio is user selectable. The higher the compression ratio, the less data is saved to represent the original image, and the poorer the decompressed image quality.

Another video image compression scheme which may be used is the Motion Picture Expert Group (MPEG)-based compression scheme. However, MPEG is not considered suitable for editing, because it uses inter-field or inter-frame information. Also, MPEG compression hardware is much more expensive than the decompression hardware, because the compression process is more difficult. JPEG can typically be compressed and decompressed using the same hardware.

Disk-based recording of video and audio is the technology that makes non-linear editing systems possible. Video is introduced into a server using any of the interchange formats mentioned above. The video is digitized, compressed, and stored on the disk drives. The stored digitized video can be rapidly accessed in a nonlinear manner. A playback system can thus automatically play back a video program from the disk using an EDL that defines the location of clips on the disk to be played and the order in which they are to be played. For playback, the data is read from the disk, decompressed, and converted to one or more interchange formats by the video server. These products may then be routed to various destinations in the production facility, including the master switchers in a broadcast facility.

SUMMARY OF THE INVENTION

The present invention provides a text based video editing system for the production of a video program having recorded video and audio elements that are time synchronized with a script to be read by an announcer while the recorded elements are being played. The present invention allows synchronization of the recorded and read elements to be maintained even when changes to the text of the script are made. The video editing system may be used to play back the compiled recorded elements of the program on the editing system itself. During playback, the script text is simultaneously displayed. The place in the script text to be read corresponding to the current place in the video being played is also indicated. This allows the video program editor to view the entire coordinated program that has been prepared, including both the recorded video and the textual script elements, allowing the editor to fine tune the timing between the recorded elements and the script elements of the program to achieve optimum synchronization.

The text based video editing system of the present invention is implemented on a computer system preferably connected to a computer network. The editing system computer hardware may be of conventional commercial design, including a monitor having a video playback capability, and speakers for audio playback. One or more editing systems in accordance with the present invention may be connected to the network, along with one or more disk-based computer servers. The editing system computer of the present invention is also directly connected to a high quality video editing server. Raw source material audio and video clips are fed to the editing server from video tape recorders (VTRs), satellite feeds, etc. The source material is preferably accessible by the server in digital or component serial digital form, and is stored in compressed form on the editing server disk. Source material video clips that are stored on the server disk are logged into a database that may be accessed by the video editing system. Similarly, news stories in text form, from wire services, etc., are also stored on network servers. The video editing system of the present invention may access this textual data from the servers through the network.

The video editing system of the present invention includes an editing system display that is divided into at least two working windows: a text window and a video window. In the text window, the script text is displayed for creation and/or editing using a word processor type computer program. A wire service news story may be loaded from the network into the editing system to be edited into script form in the text window, a script may be written from scratch in the script window, or a previously generated script may be loaded into the editing system from the network for display in the script window and further editing.

Raw video source material clips may be accessed by the editing system from the editing system server, the network, or from a VTR connected directly to the system. Raw clips are selected from the database list of available clips. The video clips may then be viewed in the editing system display video window, with the associated audio program played through the editing system speakers. When a desired raw clip is located, desired frames from the clip may be selected, then it is linked to the script text by inserting control characters into the script text at a desired location of the clip. This may preferably be accomplished by marking a portion of the script to which the clip is to be linked, and then using a conventional "drag and drop" user interface to locate the clip at a drop location in the marked text. The drop location may be at the beginning of the marked text or anywhere else in the marked text. The control characters are embedded in the text at the drop location of the clip. The selected video clip is automatically entered as an edit into an EDL. The EDL edit defines the start time of the clip, which may be the drop location, if the drop location is at the beginning of the marked text, or the drop location minus the amount of time from the start of the marked text to the drop location, where the drop location is not the starting location of the clip. The clip duration is determined from the reading time of the marked text. The control characters in the script text create a link between the text and the EDL. Additional raw video clips may be previewed in the editing system display video window and then linked to the script text by inserting control characters at desired positions in the script text in the same manner. Thus, an EDL is created, with each source material clip defined by an edit in the EDL linked to a position in the script text.

The starting time from the beginning of the script and the play-time duration of each clip defined by the EDL is determined automatically by the editing system of the present invention based on a character reading rate stored in the system. This reading rate corresponds to the reading rate of a professional announcer. A default reading rate may be used, or custom reading rates for particular announcers may be used. Different reading rates may be used for different portions of the script text by embedding reading rate control sequences in the script text.

The starting times of the source material clips defined by the EDL are determined by a software routine that scans the script from the beginning of the text. For each text character in the script that is to be read, a count of timed characters is incremented. From this count and a defined reading rate the current time from the beginning of the text is calculated. When control characters indicating a link to the EDL are encountered by the scan, the editing system updates the EDL, if necessary, to adjust the starting time of the clip defined by the linked edit by changing the starting time by an amount based on the difference between a previously calculated offset from the beginning of the text to the location of the control link sequence and the current time offset calculation. Other control character sequences besides the control link sequences to the EDL may be embedded in the script to alter the current time computation For example, duration control sequences may be embedded in the text to add a desired amount of time to the reading time calculation. These are to allow recorded action to play out without narration from the script. Also, as mentioned above, reading rate control sequences may be embedded in the text to alter the reading time calculation.

If the control links represent the start times of clips, e.g., when the drop location was at the beginning of a section of marked text, the EDL may be adjusted in response to a script text change by setting the edit start time in the EDL to the current time calculation of the scan. However, where the control link position indicates frames in the clip are to be played before the drop location, the start time of the clip is defined relative to the frame at the drop location.

Updating of the EDL in response to a change in the script text is thus facilitated by the use of an edit link table. Each entry in the edit link table links a control link sequence in the text with an edit in the EDL. The edit link table entries also include the offset time from the beginning of the text to the control link location of the video clip defined by the link edit When a link control sequence is encountered during a scan of the text, the edit link table entry referred to by the embedded control sequence is referenced. If the offset time stored in the edit link table is different from the current calculated reading time, the edit link table entry offset time is set to the current time, and the linked edit entry in the EDL is updated by adjusting the clip start time by the difference between the previous offset time and the current time (to reflect changes in the text). Otherwise, the scan proceeds without changing the edit table entry in the EDL.

When a change is made to the script text, to cause the start time of a video clip to be moved, the play-time duration of the video clip corresponding to the edited text must also be updated. This can be accomplished by either adding or deleting material from the clip, such as by adding video frames to increase the play-time duration or deleting frames to decrease the play-time duration, or by decreasing or increasing the playback speed of the video clip while keeping the same number of video frames.

The control links between the text script and the EDL are dynamic links. As additional textual material is added to or removed from the text script, the EDL is automatically updated to reflect the change. Thus, for example, if text is added to a particular portion of the script, the editing system scan of the script following the change will cause the run-time duration of the video clip associated with that portion of the text to be automatically increased. Simultaneously, the start-times of subsequent video clips defined by the EDL are moved outward in time by the reading time of the additional material added. Thereby, the recorded video elements of the presentation being edited are maintained in synchronization with the presentation script by repeatedly scanning through the text script.

The editing system of the present invention allows recorded audio and video elements to be separately linked to the script text. Thus, at any point in the script text, the text may be linked to a recorded video element from one source and an audio element from another source. Multiple audio channel elements may be combined with a single video element at any portion of the text script. Audio edits are dynamically linked to the script text by embedding link control sequences in the text. These separate audio edits thus also remain synchronized with the script text, when the text is modified, using the script scanning routine described previously.

The editing system of the present invention allows the video program editor to view the completed video program in essentially complete form, with synchronized video and text portions of the program displayed. Starting from any point in the program script, the combined video and text program may be replayed. The video portion of the program is displayed in the video window of the editing system, the audio portion of the program is played through the speakers, and the location of the audio and visual portions of the program with respect to the script text is indicated. This may be accomplished, for example, by use of a marquee window in the editing system display. The synchronized script text is simultaneously scrolled through the marquee window with the audio and video playback. Thus, the video program editor can view the complete program, and make timing changes as necessary to achieve optimum synchronization between the video and textual elements of the presentation.

The video editing system of the present invention preferably also includes an editing timeline, which is a graphical representation of the EDL. The editing timeline preferably illustrates the start time of each video clip edit in the EDL with respect to each other. A bit map representation of the first source frame of each edit may be included in the editing timeline to provide information to the user regarding the video source context. The editing timeline may also be used as a user interface control to permit modification to the edits in the EDL.

The EDL and textual elements of an edited program presentation may be stored on network servers to which the editing system of the present invention is connected. The text script and linked EDL defining the corresponding audio and video clips, may then be accessed from the network by a networked newsroom automation system computer for on-air broadcast. For example, the edited script text may be displayed on a teleprompter while the corresponding EDL is used by the system to play back the video clips in the defined order and play-time duration. Since the on-air playback function may be controlled by a computer system connected to the network other than the editing system computer, presentations may be created and edited using audio and video clips from the editing server and network at the same time as an on-air broadcast is proceeding.

Though described with respect to the preparation and editing of a broadcast news story, the editing system of the present invention may be used for the editing of any video or audio program requiring the synchronization of recorded audio and video elements with a textual script, whether read or merely displayed Thus, for example, the editing system of the present invention may be used by authors of educational and entertainment programs that are presented on CD ROM. The editing system of the present invention may also be used for the preparation of educational and corporate multimedia presentations.

Further objects, features and advantages of the invention will be apparent from the following detailed description when taken in conjunction with the accompanying drawings.

DETAILED DESCRIPTION OF THE INVENTION

The text based video editing system of the present invention allows the creation of multimedia presentations with dynamic synchronization between visual and textual elements. The editing system of the present invention may be used for the creation and editing of any such presentation requiring the coordination of audio and video elements with a written textual script that is either read or displayed simultaneously with play back of the video elements. Thus, the editing system of the present invention may be used to prepare and edit CD ROM based educational or entertainment products. Similarly, the editing system of the present invention may be used for the preparation of educational or corporate multimedia presentations. An application to which the editing system of the present invention is particularly well suited, however, is the preparation of live or recorded for broadcast television news stories. The editing system of the present invention will be described in detail with respect to this exemplary application, it being recognized that the editing system of the present invention may be used for any multimedia production requiring synchronized video, audio, and textual elements, such as those listed above.

In the following description, the term "video" is used in a general sense to refer to video, audio, or any other recorded medium. Thus, the term "video clip" refers to a recorded clip of video, audio, or, commonly, a combination of the two. It is thus understood that any recorded medium may be dynamically linked to a script text in accordance with the present invention by embedding a control link sequence into the script text that links the text to an EDL edit defining that medium (audio, video, audio/video, etc.), as described in more detail below.

Figure 1:
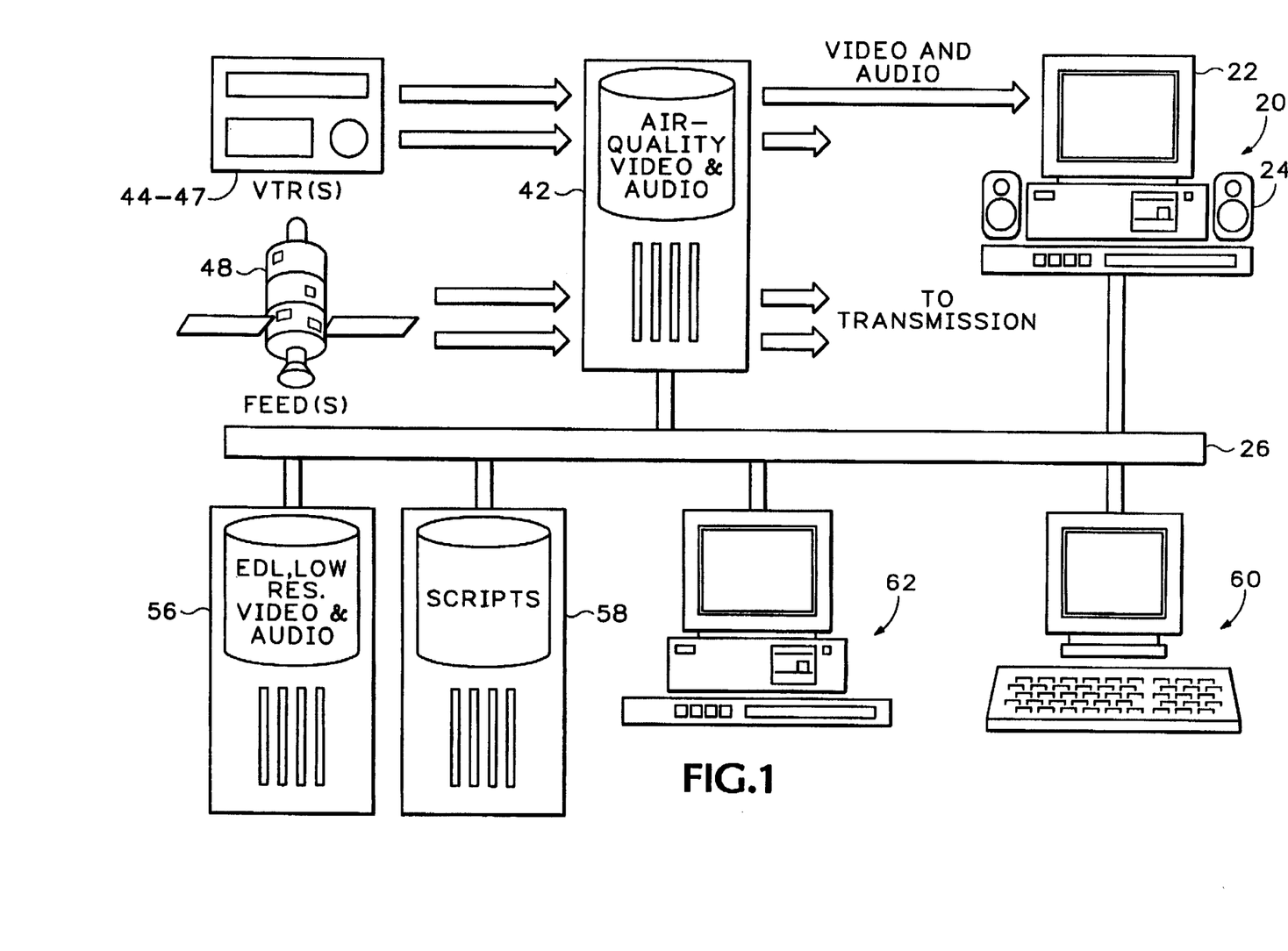
FIG. 1 is a schematic illustration of a hardware configuration for the text based video editing system of the present invention as integrated into an automated newsroom system network.
Figure 2:
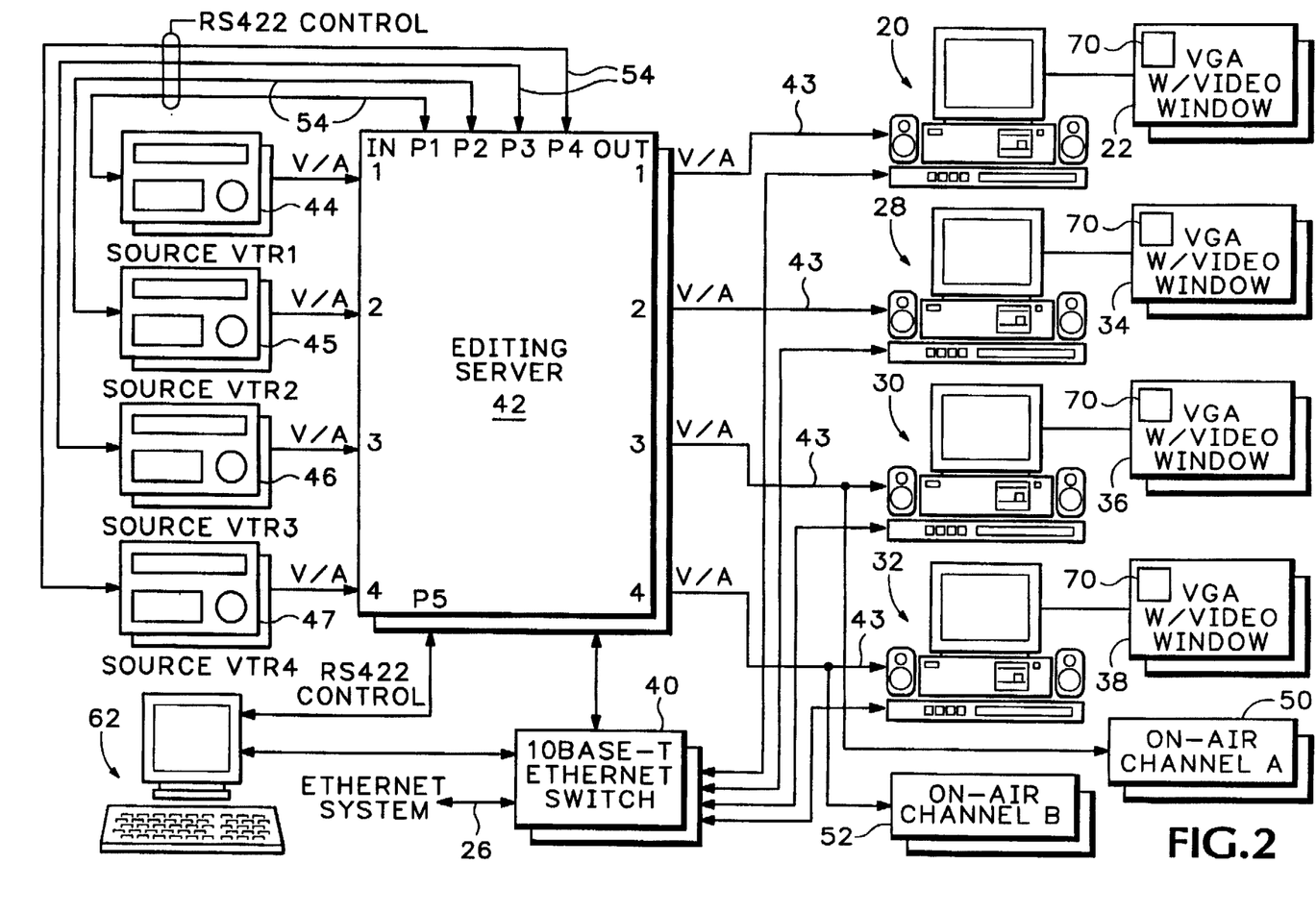
FIG. 2 is a schematic illustration of an alternative hardware configuration for a text based video editing system in accordance with the present invention showing multiple editing systems connected to multiple video sources and a newsroom system network.

Exemplary newsroom data networks, including the editing system of the present invention, are illustrated in FIGS. 1 and 2. The editing system of the present invention may be implemented using a conventional commercially available computer system or work station 20. The computer system 20 must include a video display 22, for displaying the video and textual elements of the program presentation being created or edited, and may include speakers 24 for providing the audio elements of the presentation. Though a variety of commercial computer systems may be used for the editing system computer 20, a preferred computer system is the HP Vectra P90 computer with embedded SVGA PCI video capability, 2 megabytes of video RAM, 16 megabytes of RAM, a 500 megabyte hard disk, PCI NIC, a Sound Blaster 16 audio card, a FAST video overlay card, a 3½ inch floppy disk drive, a CD ROM, a 17 inch CTX SVGA monitor, a 101 keyboard, a mouse, and the speakers 24. The computer system 20 preferably operates using the Windows 95 operating system from Microsoft Corp., although other operating systems may also be used.

The editing system computer 20 is preferably connected to the newsroom computer network 26. As illustrated in FIG. 2, multiple editing system computers 20, 28, 30, and 32, with associated editing system displays 22, 34, 36, and 38, may be connected to the computer network 26. The computer network 26, may, for example, be implemented as a conventional ethernet network, such as Intel Ethernet Express NIC, including an ethernet switch 40. Text, data, and low resolution video and audio may be transferred to and from the editing system computer 20 across the network 26.

The editing system computer 20 is also connected directly to a video server 42. This may be accomplished using dedicated cables 43 from the editing server 42 to the editing system computers 20, 28, 30 and 32. The editing system computer 20 accesses high quality audio and video from the editing server 42. No video or audio data is preferably ever sent to the editing system computer 20. However, the video and audio products of the server must be made viewable by a system user. This is accomplished by providing analog video and analog audio signals on the dedicated cables 43 from the editing server 42 to the editing computer 20. At the editing system computer 20 the audio is monitored on the speakers 24 and the video is presented as a window on the editing system display 22 using a standard video overlay card in the editing system computer 20. It is also possible to loop the signal through a standard video monitor It may also be possible, in the future, to transmit audio and video data to the editing computer system 20 via a network, where it will be decoded and displayed.

Audio and video may be fed to the server 42 from multiple audio and video sources. For example, multiple video tape recorders (VTRs) 44–47 may be connected to feed audio and video clips to the editing server 42. Similarly, audio and video feeds from other sources, such as from satellite links 48, may also be fed to the editing server 42.

A preferred editing server 42 is the Tektronix Profile editing server. This editing server 42 may be configured for multiple input and output audio and video channels and supports video interchange in a variety of formats (e.g., component serial digital, etc.). As shown in FIG. 2, the exemplary editing server 42 has four input video/audio channels connected to VTRs 44–47, and four output video/audio channels connected to the editing system computers 20, 28, 30, and 32. Two of the output channels of the editing server 42 are also connected to two on-air channels 50 and 52 for broadcast of the video/audio provided by the editing server 42. The editing server 42 also provides control signals to control the operation of the VTR sources 44–47. These control signals are provided, for example, on RS422 control lines 54 from the editing server 42 to the VTRs 44–47.

The editing server 42 is preferably capable of receiving and transmitting component serial digital video, composite analog video, and multiple channels of analog audio. To maintain the highest signal quality, it is preferable to use component serial digital video signal inputs to the editing server 42. Thus, the VTR sources 44–47 are preferably component serial digital recorders. However, if the source material is analog, such as from YUV (Beta) videotape, an analog-to-digital converter may preferably be used to convert the analog video signal to a component serial digital video signal. A preferred analog-to-digital converter is the Ensemble Systems Serial Box III, although any component analog-to-digital converter that outputs serial component digital may be used.

The editing server 42 preferably also includes a disk storage capability. Incoming component serial digital or other video signals are digitized and may be compressed, e.g., using the JPEG compression scheme, before being saved on the editing server disk. Selected video clips from the VTRs 44–47 or other sources may, therefore, be stored on the editing server disk for rapid access by an editing system computer 20, or for playback on an on-air channel 50 or 52.

Other data is transferred between the editing system computer 20 and the editing server 42 over the network 26. Thus, for example, control signals are provided to the editing server 42 from the editing system computer 20 over the network 26. These control signals may, for example, include instructions to the editing server 42 to control one of the VTR sources 44–47 to play a tape at a desired speed, to rewind, fast forward, or pause a tape, etc. Control signals from the editing system computer 20 through the network 26 may also instruct the editing server 42 to provide video or audio clips from the editing server disk to the editing system computer 20. The clips are first decompressed and then converted to analog signals before being provided on the lines 43 to the editing system computer 20.

Besides the editing server 42, other servers, e.g., servers 56 and 58, may be connected to the network 26. These servers 56 and 58 preferably contain disks or other storage devices for saving data which may be accessed by the editing system computer 20. For example, one server 56 connected to the network 26 may be configured to store the EDL, and low resolution video and audio. Another server 58 may be configured to store textual material, such as scripts to be edited on the editing system computer 20, or raw text news stories from a news wire connected to the network or from another external feed 48. One of the servers 56 or 58 may also contain a database listing of video clips. Video enters a newsroom from a variety of sources, including field tapes and feeds. Raw clips recorded on the editing server 42 or elsewhere on the network may be logged into a database stored in one of the servers 42, 56, or 58. Each database entry contains relevant information that allows a database query to locate the clip given a partial description. A conventional commercial database program may be used for this purpose. The information stored on the servers 56 and 58 is accessible by the editing system computer 20 through the network 26.

A machine control computer 60 may also be connected to the network 26. The machine control computer 60 is used by a network system operator to maintain proper operation of the network 26, and may also be used to access and control the servers 42, 56, and 58 and other equipment connected to the network. Thus, for example, the machine control computer 60 may be used to control the editing server 42 to play back a video segment, from one of the VTRs 44–47, or from the editing server's internal disk, to an on-air channel 50 or 52. The machine control computer 60 accomplishes this control through control signals applied through the network 26.

Newsroom automation system computers or work stations 62 may also be connected to the network 26 and to the editing server 42. After having edited a script and synchronized video performance using the editing system of the present invention, it will be desirable, in a newsroom setting, to simultaneously play back the video portion of the performance on an on-air channel 50 or 52 while directing the script text to a teleprompter for reading by an announcer. Moreover, it will also be desirable to combine multiple edited video and textual stories into a complete news broadcast performance, by combining several performances created, perhaps by different program editors on different editing system computers 20, 28, 30 or 32, using the editing system of the present invention, and then playing back the stories in a desired order. These functions may be accomplished, for example, by a newsroom automation system running on the computer 62. The newsroom automation system computer 62 is connected to the network 26, and, therefore, has access to all of the network resources, including materials on or accessible by the servers 42, 56, and 58. An exemplary newsroom automation system which may be used in this role is the NewStar system available from Dynatech (now Tektronix) NewStar, of Madison, Wis.

FIGS. 1 and 2 illustrate exemplary system networks that facilitate the operation and use of the editing system of the present invention. These networks, oriented to newsroom production, provide access to video, audio, and textual material for editing by the editing system of the present invention, and also provide for post editing use, e.g., broadcast, of the resulting performance created using the editing system of the present invention. It is apparent that other, and widely diverse, hardware networks may be used in association with the editing system of the present invention. The assembly of a network system, including the networks illustrated in FIGS. 1 and 2, will be known to those having skill in the art of computer network and newsroom automation system set-up. In particular, each component illustrated in FIGS. 1 and 2 may be implemented using commercially available hardware. Hardware connection and control details will, therefore, be available from the supplier of whichever commercial equipment is chosen to be used to assemble the network.

Figure 3:
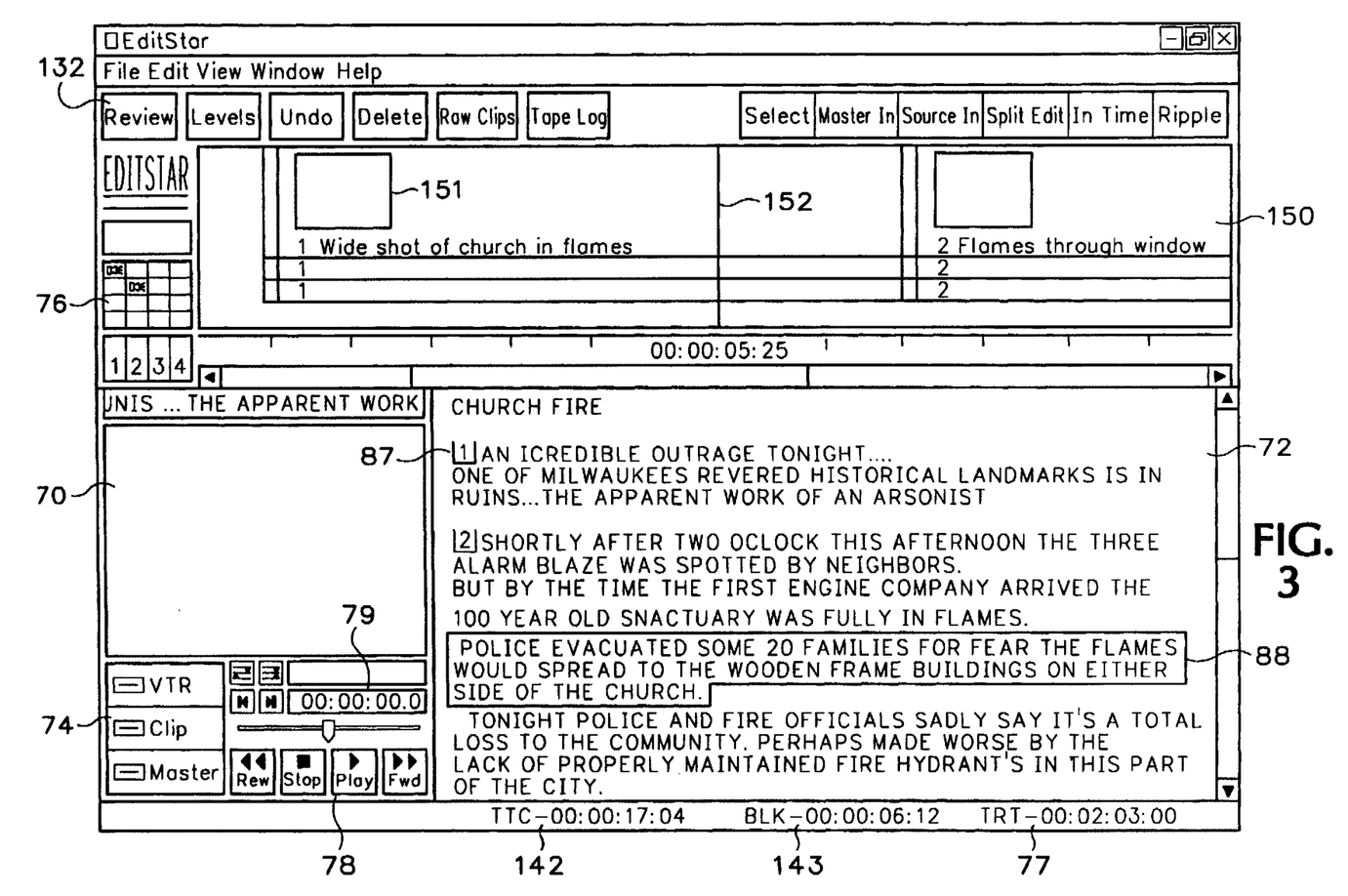
FIG. 3 is an exemplary display for a text based video editing system in accordance with the present invention showing simultaneously displayed video and script text windows.

The operation of the text based editing system of the present invention is described generally with reference to FIG. 3, which shows an exemplary editing system display. The editing system display features a video window 70, a text window 72, and various other user interface buttons and displays. The video window 70 is used to preview and select raw video clips to be inserted into a presentation, and to view the play back of a video program during the editing process or after editing is complete. The script window 72 displays the text of a script being edited. The script text itself is the primary user interface for editing a video presentation. Text displayed in the text window 72 may be edited using a conventional text editor, or word processor. Note that the layout of the video window 70, the text window 72, and the other portions of the editing system display need not be as shown in the exemplary display of FIG. 3. The video window 70 and text window 72 may be sized and positioned on the display in any manner desired. The other user interface control buttons and displays presented on the editing system display will depend, in part, on resources which are available to the editing system through the network 26 or through the editing server 42. Use of Microsoft Windows or a similar operating system allows a computer programmer having skill in the art to rapidly implement and lay out the video window 70, text window 72, user interface buttons, and other displays, on the editing system display in any manner desired.

The process of using the editing system of the present invention to prepare a linked video and textual presentation will now be described. First, the text of a script is displayed in the text window 72. The text script may be a previously generated script stored in a server on the network 26, a raw text news story retrieved from the network 26, or may be input directly into the text window 72 by a program editor using the editing system word processor. The word processor also allows the program editor to edit the script text in a conventional manner, by, for example, inserting text, deleting text and moving text around in the script.

Next, video clips to be linked to the script text are selected. First, the source of the video clips must be selected. The available sources for video clips will depend on the available sources connected to the editing system computer 20 either through the network 26 or through the editing server 42. Selection of the source for the raw clip source material is made using a source selection user interface 74 on the editing system display. As shown in the exemplary display of FIG. 3, three sources of video clips may be available, a VTR, a clip database, and a master database. Thus, the VTR, Clip, and Master controls presented in the user interface 74 may allow the user to view external video (most commonly from a VTR), digitized raw video clips from the editing server 42, and edited video from the server 42, respectively. The raw video clip database is accessed via a menu item. Another window appears that lists the raw video that resides in the server 42. From the previously generated database, in which available raw video clips have been logged by description, as described above, a video clip of interest is selected. The database includes the location of the video clip on the editing server 42 or elsewhere on the network. The video clip may thus be accessed and played in the video window 70 to preview the clip. The audio portion of the video clip will be simultaneously played through the editing system computer speakers 24. Note that the audio portion of the program may include multiple audio channels. The editing system of the present invention preferably includes the capability for selecting which audio channels are replayed. Thus, an audio patch panel user interface 76 may be provided on the editing system display. Video play back interface controls 78 are also preferably included in the editing system of the present invention to control playback of the video clips. These controls 78 preferably implement the conventional video playback options including play, stop, rewind, fast forward, shuttle control to play the tape at various speeds, and controls to move forward or back in the selected video scene frame by frame. The video play back controls may also allow an operator to put "bookmarks" at any location in the video segment. This can allow the user to move quickly to any marked location in the video material. A time code window 79 preferably allows the user to view where, in time, the section of video clip being currently viewed in the video window 70 is located.

Figure 4:
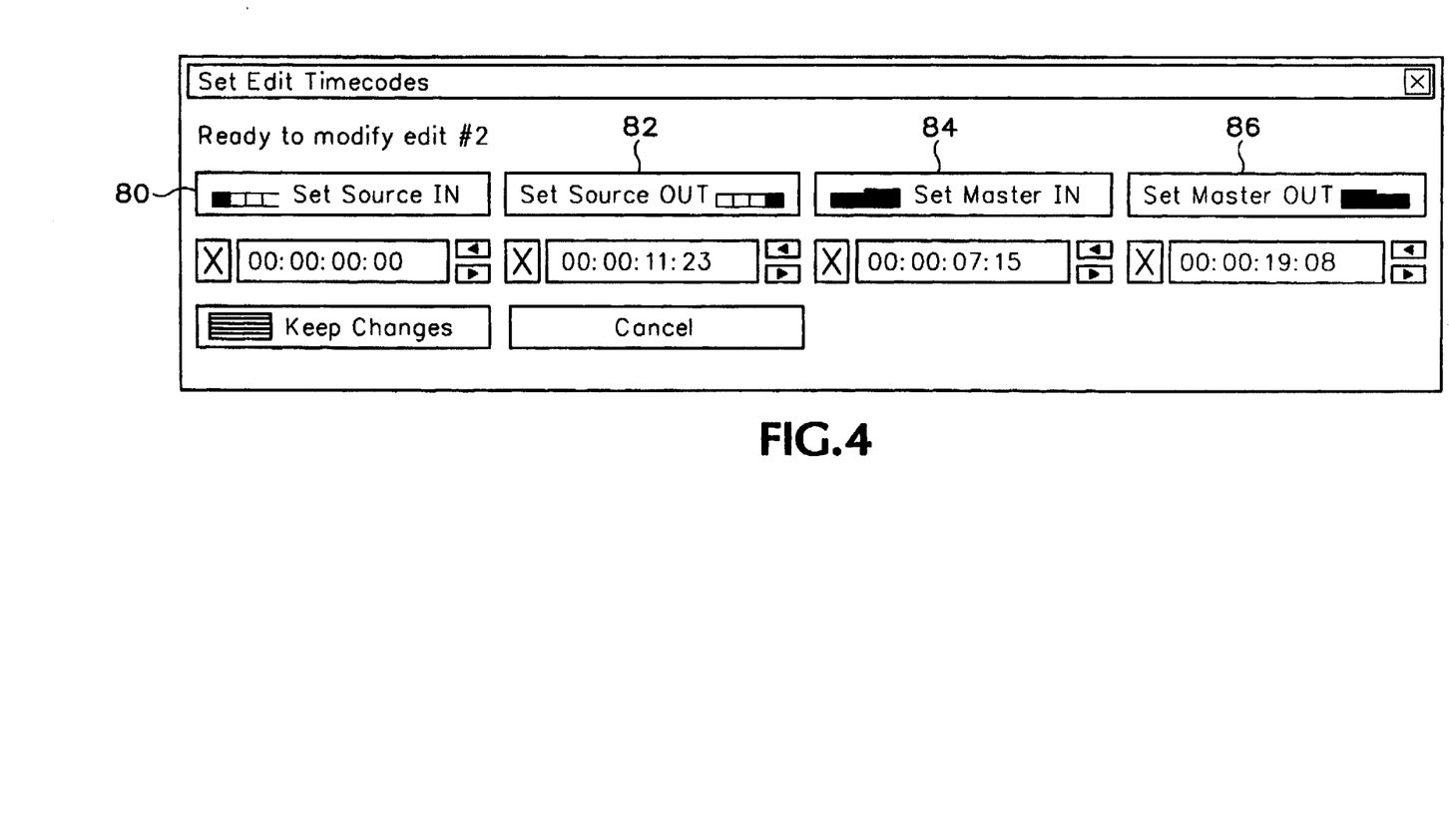
FIG. 4 is an exemplary user interface for editing a video clip used in the editing system of the present invention.

User interface and display windows are preferably provided to edit the selected video clips which are to be linked into the script text. Exemplary user interfaces, which may be located anywhere in the editing system display 22, are illustrated in FIG. 4. For example, a SOURCE IN button and display 80 may be used to select the first frame from a source clip that is to be included in the edit. The SOURCE OUT button and display 82 may be used to select the length of the clip to be used. The MASTER IN button and display 84 may be used to select the location on a time line where the clip is to be inserted. The MASTER OUT button and display 86 is used to represent the amount of time for the remainder of the clip, minus the portion removed. The ability to select frames of a video clip to be included in an edit is a common feature of known nonlinear video editing systems, and may be implemented in various ways by those having skill in the art.

Once a desired video clip is found, it is linked to the script text displayed in the text window 72. This is accomplished by indicating; in the text window, where in the text the video clip should be placed. Various user interface styles may be used for linking a video clip to the script text. The preferred user interface style used for linking video clips to the script text is referred to as "drag and drop". This is a standard technique which may be implemented by one skilled in the art. To make an edit link between the script text and an EDL, a user first selects a raw clip from the database in the manner described. He then locates a desired source frame in the clip using the playback interface controls 78. Then he can "drag" from the video display window 70 and "drop" the clip into the desired location in the script text displayed in the text window 72. Drag and drop may be performed by pressing and holding a mouse button down while moving the cursor to a drop target location, then releasing the mouse button.

An EDL entry, called an edit, is created to define the video clip which is now linked to the script text. The play time duration of the linked clip may be determined by the reading time duration of a marked block of text 88 to which the clip is linked, if desired. Alternatively, if no block is marked, the play-time duration of the clip is extracted from the database entry for that raw video clip, and is set so that the edit does not define a play-time duration longer than the amount of digitized video available for that clip. A default clip duration, e.g., 2 seconds, may be used.

The method of linking a video clip to the script text preferably also supports back-timing. This allows a video clip to be dropped at any location within a marked block of script text 88. Three timing values are available at the moment of dropping a clip into a marked block of text. There is the block start location, block end location, and the drop location In back-timing, the new edit is constructed so that the desired source frame appears at the designated drop location, even though source frames from that video clip are to be made visible prior to the drop location. To accomplish this, the clip's effective starting time (source frame) is set equal to the designated source frame minus the difference between the drop location and the block start. In this case, the edit link appears at a location in the script text that does not correspond to the actual starting time of the new clip. However, as described below, the desired relationship between a selected source frame and the position of the corresponding edit link in the script is maintained by the editing system of the present invention.

The drag and drop user interface provides a means for quickly and intuitively designating all of the information about an edit, including the first source frame (EffectiveSource), the starting time specification for the beginning of the edit (EffectiveEditStart), and the play-time duration of the edit (EffectiveDuration). By marking a block of text 88 the user allows the editing system to determine the required edit duration and the time parameter for the start of the edit in the program. Marking a block of text is a standard operation in word processors designed for Microsoft Windows. By designating a third time parameter, the drop location, by dropping at the point in the marked block of text where the source frame is to appear, the user provides the system with the information needed to construct the appropriate edit. The third time parameter is thus generated from the location of the drop point in the script. In the back-timed scenario, the drop location is in the middle of the marked block 88. In all cases, the editing system of the present invention computes the first frame of the clip to be played (EffectiveSource) using:
EffectiveSource=DropLocation−TextBlockStart+SelectedSource; the edit duration using:
EditDuration=TextBlockEnd−TextBlockStart; and the starting time for the beginning of the edit:
EffectiveEditStart=TextBlockStart, where all parameters are expressed in frames. It is apparent that if the drop location is equal to the beginning of a marked block of text, then the first frame of the clip to be played is the selected source frame, and the clip begins playing at the drop location in the text.

TextBlockStart and TextBlockEnd are the time parameters generated by computing time offsets of the beginning and end of the marked text block from the beginning of the script text. In this instance, the location of the start and end of the text block are substituted for the location of an edit link in the timing procedure described below, and the two time values generated are two of the parameters used to calculate the effective edit parameters above. Timing values for the marked text block are thus generated by scanning the script text using the routine described below The location of the text block start and end is used in place of an edit link sequence while computing these values.

Additional video clips may be linked to the script text by selecting the clip source using the source selection user interface 74, setting the audio channels to be replayed using the audio patch panel 76, previewing the video clip, if desired, using the video control user interface buttons 78, and then linking the clip to the script text in the text window 72 by indicating the desired location of the video clip with respect to a particular portion of the script text. Audio only clips may be linked to the text in a similar manner. As described in more detail below, if the additional video clip is inserted into the text in a position which would overlap the play-time of another video clip, the play-time duration of the first of the two video clips in the EDL will be automatically amended by the editing system of the present invention so that the first video clip will stop playing simultaneously with the start of the second video clip.

Video clips are linked to the text script to create an entire linked video and script text presentation. Video clips need not be linked to the script text in any particular order, and, as previously described, may be linked to the text in overlapping positions The video editing system of the present invention will automatically update the EDL to reflect the effect of the addition of subsequent additional video links to the script text on previous links.

Each video clip is linked to the script text by a control link sequence of control characters embedded in the text at the drop location of the clip. Each control link designates a linkage to the EDL. The control link sequences are preferably not displayed in full on the text display window 72; however, the location in the script text of links between the script text and video clips are preferably indicated in some manner, e.g., by sequential numbers set off by delimiters 87.

The links between the script text and the video clips defined by the EDL are dynamic links. Thus, as text is added to or deleted from the script, or as additional video clips are linked to the text script, the EDL is dynamically updated to reflect the changes. This is achieved by a software routine which scans the script text. In each scan, changes in the relative positions of the embedded control link sequences in the script text are applied to the linked EDL components.

Thus, the video editing system of the present invention is capable of automatically re-editing the video program defined by the EDL to match changes made to the script, thereby maintaining the synchronization of the video to the script as specified by the user.

Figure 5:
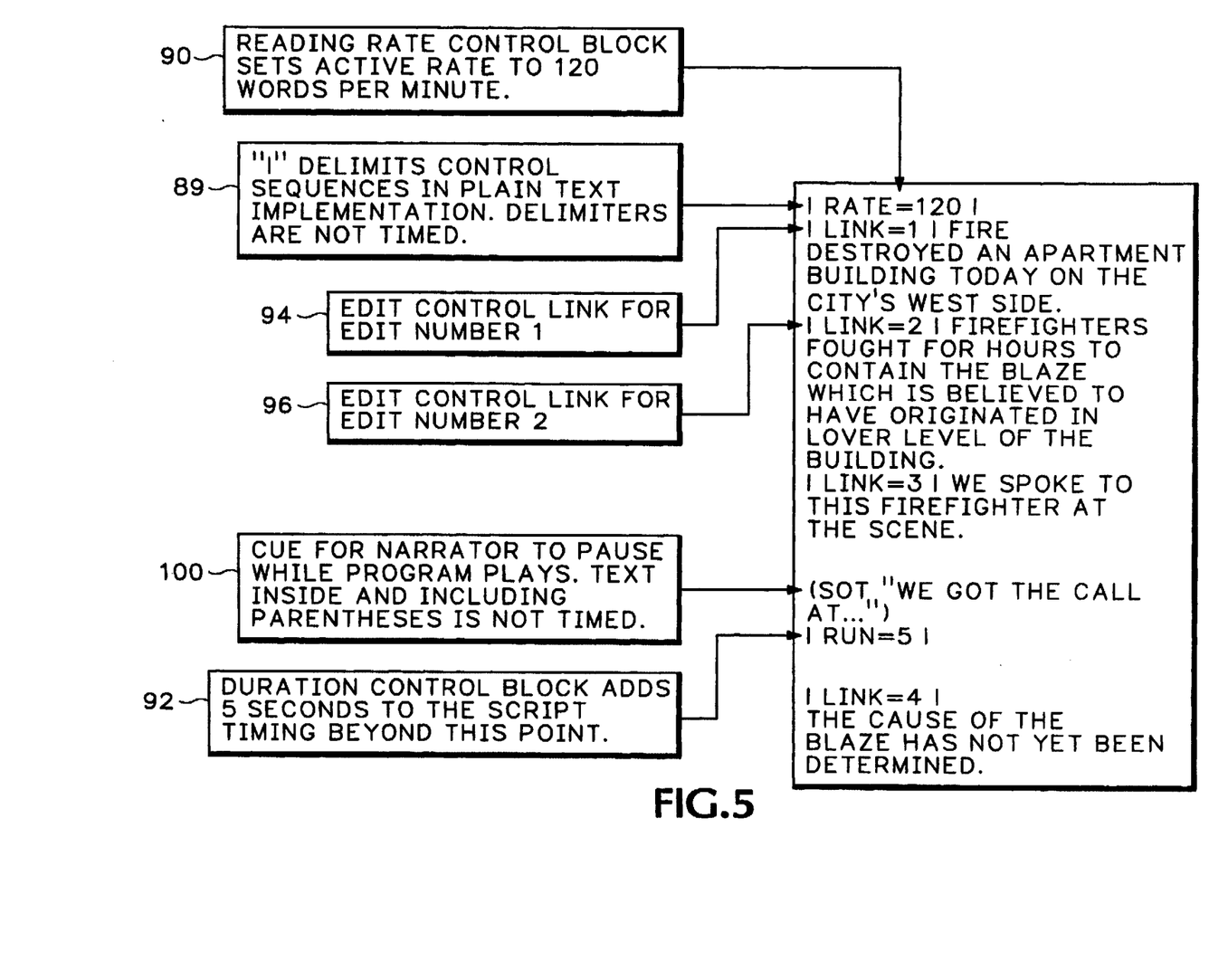
FIG. 5 is an exemplary portion of script text with embedded control link sequences to link the script text to recorded video clips.

As described previously, the body of the script represents text that will be read by an announcer. Besides text to be read, and control link sequences to video clips, other control sequences may also be embedded in the script text. An exemplary annotated script text showing embedded control sequences is illustrated in FIG. 5. Note that each control sequence of any type is distinguished from to-be-read text by delimiters 89.

Professional announcers reliably read a constant number of words per minute. In some cases, successive sections of a script are read by different announcers whose reading rates are considerably different. Thus, a reading rate control sequence 90 may be embedded into the script text to establish the reading rate for the text that follows. The reading rate indicated by the reading rate control sequence will be used until a new reading rate control sequence is encountered by the editing system of the present invention as it scans the script text. The reading rate defined by the reading rate control sequence is used in the calculation of the starting time from the beginning of the script of the video clips linked to the script text.

Other control sequences embedded in the text script may also effect the computation of the video clip start times. Often an announcer must pause for significant periods of time while a recorded video segment plays out. To maintain synchronization of the script with the recorded material, duration control sequences 92, indicating the length of the required pause, may be embedded in the text. The duration control sequence adds the specified amount of time to the calculation of the reading time from the beginning of the script.

Other material appearing in the script text does not affect the calculation of the reading time. Edit control sequences, linking the text script to the EDL, are not timed, and do not affect the reading time calculation. Control link delimiters 89 also do not affect the time calculation. Other textual material may also be present in the script which does not affect the reading time calculation. Such other textual material may include, for example, cues 100 for various people who assist in the production of a televised broadcast. Cues are not timed, and are not read as part of the presentation, but rather provide auxiliary information to the performers. Thus, cues, which are set off from the read text by defined delimiters, also do not affect the reading time calculations. This cue text, as well as the control sequences, may be said to include non-timed characters, as opposed to the to-be-read script text, which includes all timed characters.

The operation of the editing system of the present invention to maintain synchronization between the script text and linked video clips will now be described. The starting time from the beginning of a read script and the play-time duration of video clips defined by the EDL and linked to the script are calculated by computation of the reading time from the beginning of the script to an arbitrary location in the script text. This computation is accomplished by scanning the script text to count the timed characters, calculating a current time from the beginning of the script, and making adjustments to the EDL based on the control sequences that are encountered during the scan.

As described previously, each time a video clip is selected to be linked with the script text, a control link sequence is embedded in the script text and an entry in the EDL is created. The EDL thus records the editing process undertaken by the program editor in the creation of the synchronized video and script text program. Each entry in the EDL specifies a video source material clip. Each entry in the EDL may be referred to as an "edit", with the corresponding control sequence in the script text referred to as an "edit control link". A preferred data structure for each edit in the EDL is:

```
struct
{
    // serial number of the edit
    // each edit has a unique ID
    int EditID;
    // serial number of the source media
    // each source clips has unique ID
    int Source ID;
    // frame address of first source frame
    displayed int FirstSourceFrame;
    // frame address of where the frame appears in the
    // program
    int ProgramFrame;
    // Number of frames included in the program
    int FrameLength;
    // 1.0 normal play speed
    < 1 slower than normal
    > 1 faster than normal
    double PlaySpeed;
};
```

As shown, each edit in the EDL is characterized by a unique edit ID number, and a source ID number that indicates the source of the video clip. The source ID number may refer to a table entry indicating the location of the video clip on the edit server 42 or network 26. Other portions of the edit data structure indicate which portions of the video clip are included in the edit, and, optionally, the playback speed of the video segment indicated by the edit. The portion of the video clip included in the edit is preferably indicated by frame numbers. Frame numbers are typically used to address video and audio media. The frame rate varies with the type of media, but 30 frames per second is standard for NTSC video. The EDL, composed of a series of sequential edits, thus defines an arrangement of frames from a pool of source material in a desired program order.

In accordance with the editing system of the present invention, edits in the EDL are preferably processed in an order. Edits encountered near the end of the EDL preferably supersede those found near the beginning of the EDL. Thus, in case of a conflict wherein multiple edits define different frames of media that are to be displayed at a same given program location, the frame of media that will be displayed is that specified by the edit processed later, i.e., the edit found later in the EDL. Other strategies for dealing with conflicting edits may also be used, and may be made user selectable in a video editing system in accordance with the present invention.

The edit control sequences embedded in the script text designate links to the edits in the EDL. Each edit link control sequence contains an edit identifier associated with a corresponding edit in the EDL. An edit link table is preferably used by the editing system of the present invention to link the control sequences with the EDL. Use of an edit link table facilitates the script text scanning procedure described below, making possible the synchronization of back-timed clips, whose starting times differ from their drop locations. A preferred edit link table entry data structure is as follows;

```
struct
{
    // linked to EDL edit whose ID is equal
    int EditID;
    // last known offset of edit link control block in
    // the script
    int FrameOffset;
};
```

As shown, each entry in the edit link table records the edit identifier and corresponding frame offset for each link. The frame offset defines the time of the drop location of the control link sequence from the beginning of the script text.

Synchronization between the script text and recorded video segments is maintained by scanning the script text and modifying the EDL to reflect changes to the script text since the script text was previously scanned. The preferred routine for scanning the script text and updating the EDL is described with reference to the flow chart diagram of FIG. 6. The scanning routine, implemented as a software program, looks for occurrences of control sequences, while maintaining the reading time from the beginning of the script (current time) for the current location in the script.

Figure 6:
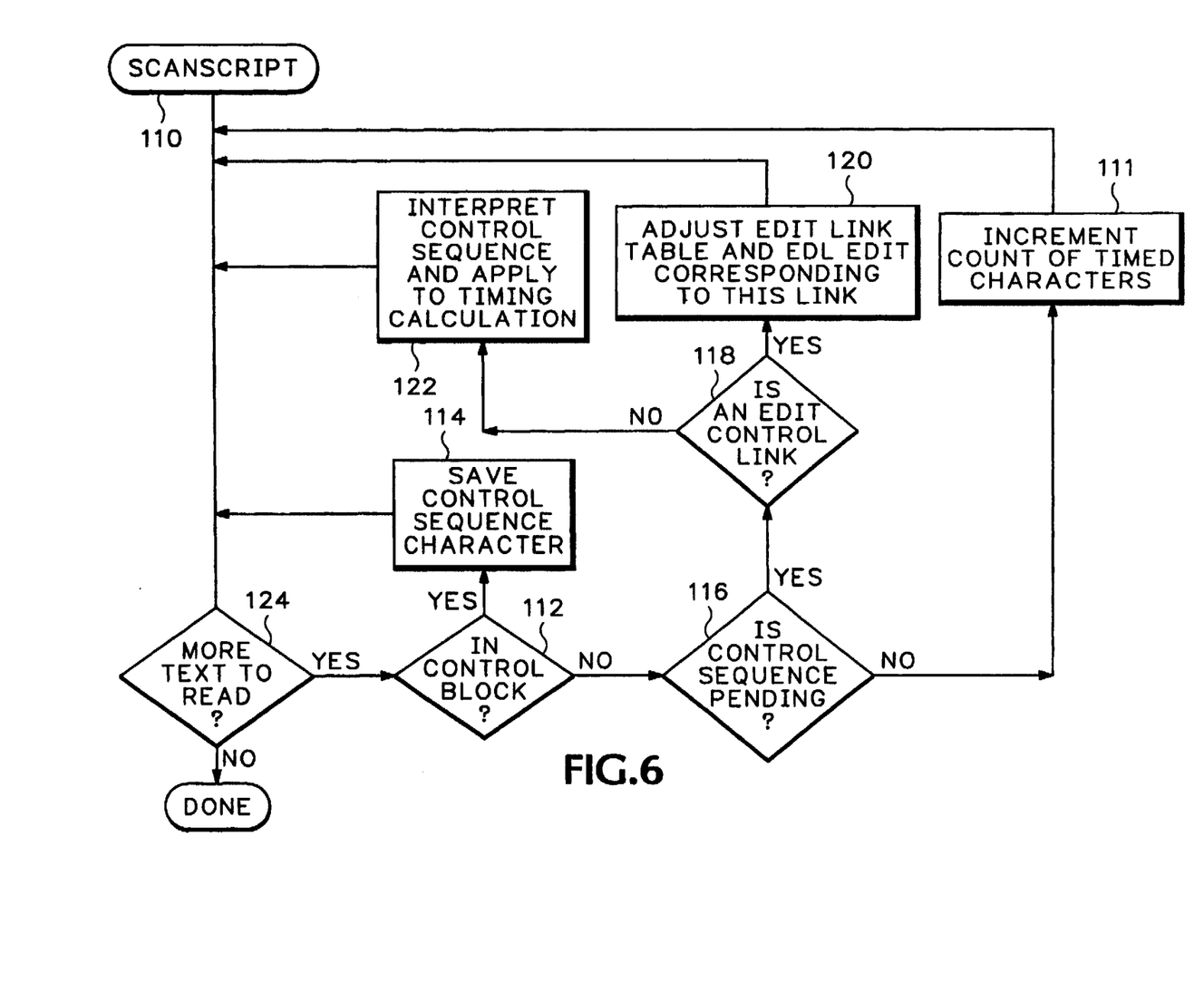
FIG. 6 is a flow diagram of a script text scanning routine in accordance with the present invention for synchronizing linked video edits with the script text.

The scan script routine 110 examines each character in the script text. If the examined characters are non-timed characters, the characters are ignored for timing purposes. For each timed character encountered, a count of timed characters is incremented 111, and, using a reading time calculation based on a defined reading rate, the current time duration from the beginning of the text is updated. The current time may be calculated in frames based on the count of timed characters and the reading rate using the following computation:

$$T=(60*F*C)/(R*6) \text{ where}$$

T=reading time duration in frames

F=frame rate (example: 30-frames/second for NTSC video)

C=number of characters included in the timing

R=reading rate in words per minute and assuming an average of 6 characters per word.

If a control block sequence delimiter 89 is encountered, the scanning routine recognizes the subsequent characters as control sequence characters 112, and saves the control sequence characters until another control sequence delimiter is encountered 114. The scanning routine then determines the nature of the pending control sequence 116. If the control sequence indicates an edit control link 118, the scanning routine finds the entry in the link table corresponding to the control link sequence using the edit identifier included in the control link sequence. The current time is compared with the frame offset or previously calculated time from the beginning of the script for that entry. If they are different, the corresponding edit in the EDL must be updated 120. The starting time of the video clip referenced by the edit entry in the EDL is adjusted by the difference between the current time and the previously calculated frame offset stored in the edit link table to reflect changes to the script text. The frame offset reference of the link table entry to the particular edit is then updated to the current time location. Thus, it is apparent that once the link between the script text and EDL is established, all adjustments of edit start times are relative to changes in the control link offsets from the beginning of the text script. If the control link sequences in the text were restricted to indicate the starting time of clips, the edit link table could be eliminated, and adjustments could be made during the scan by setting the edit starting time to the current time calculation. This, however, would not be compatible with the edit back-timing capability described previously.

If the encountered control sequence is not an edit control link 122, the scanning routine interprets the control sequence and, if appropriate, adjusts the reading time calculation, or increments the reading time, as appropriate. Thus, for example, a reading rate control sequence will be interpreted to require the new reading rate defined by the control sequence to be applied to the reading time calculation. Similarly, a duration control sequence will be interpreted to add the specified amount of time to the current time calculation.

The text scanning routine continues until the script text is exhausted 124. The scanning routine may be repeated at any interval desired to provide for dynamic changes to the edits in the EDL in response to changes in the script text. Thus, the scanning sequence 110 may be repeated continuously or periodically by the editing system computer 20, in the background, while the program editor is using the editing system word processor and video window 72 to prepare a synchronized video program. The script is preferably scanned periodically to update a user interface display of the time offset to a cursor placed somewhere in the script text, the total script duration, and the duration of a marked block of text, if such features are made available to a user. Thus, the script text may preferably be scanned at a rate of approximately ten times a second. This interval between scans is frequent enough to give feedback to the user without apparent delays. The scanning may be accomplished less often if the editing system computer 20 is busy doing something else.

A software flag is preferably set when the script text content in the word processor is changed. On the next scan, the condition of the flag causes the EDL adjustment routine described to be invoked. Then the flag is cleared. The scanning routine software is preferably constructed so that user triggered events, like typing on the keyboard, have priority over the EDL adjustment process. The EDL adjustment process may be deferred until the user has stopped typing for the moment. This is a preferred optimization to improve the performance of the user interface by eliminating annoying pauses while typing.

The scanning routine previously described changes the program start time of particular edits. Thus, if text is added to the script, edits following the modified portion of the script text will be moved later in time to maintain synchronization between the video clips and the script text. However, moving the edits later in time may leave undefined, displaced, program frames in the time portions from which the moved edits were moved forward. These displaced program frames may preferably be replaced by contiguous source frames from the edits immediately previous to the moved forward edits. Thus, the play-time duration of the video segment defined by the edit previous to the moved forward edits, i.e., the segment corresponding to the portion of the script to which text was added, is increased to correspond to the increase in script text material associated with that clip. Alternatively, it may be desirable to modify the time base of the edit previous to the moved edits, rather than adding additional frames of material to this edit. Thus, the playing time of the video clip source material corresponding to this edit may be stretched so that the clip fills the time displaced by the moved edits without adding frames to the edit. This is achieved by altering the play speed entry in the corresponding edit data structure. In either case, whether by altering the play speed or adding frames from the video clip, the scene change between video clips is maintained synchronized with the position of the edit control block sequence in the script text. Similarly, when text is removed from the script, the play-time duration of the video segment linked to the edited portion of the script may be adjusted by removing frames from the edit or increasing the play speed of the edit. Edits following the changed text will be moved backward in time by the scanning routine to maintain synchronization between the video clip and the script text. The modification process to be used to update the play-time duration of the EDL edits may be selected based on the capabilities of the available play-back mechanism and/or the choice of the video program editor.

The editing system of the present invention preferably provides for viewing of the edited and synchronized video and script text program in a manner such that the synchronization of the video program with the script text is made apparent to the program editor. This may be accomplished using a marquee window 130 on the editing system display, as illustrated in FIG. 3. A user interface control button 132 on the editing system display is preferably used to initiate replay of the edited story from the beginning or from a selected location in the script text. Video clip segments defined by the dynamically edited EDL are retrieved by the editing system computer 20 from or through the editing server 42. The video clips are displayed in the video window 70 in the defined sequence, with the corresponding audio program played on the editing system speakers 24. As the video program is played in the video window 70, the portion of the synchronized text corresponding to the video being played is scrolled through the marquee window 130. At any instant in time, the video segment being played in the video window corresponds to the text at the center or at a marked point of the marquee window 130. Thus, the video program editor is able to verify the synchronization of the video portion of the program with the script text.

Various other user interface and display features may be included in the editing system of the present invention. For example, a script status window (not shown) may be associated with the text window 72. The script status window may include such information as the date the script was filed or created, the time that a script was filed or created, an indication of the author or source of the script text, an estimated reading time of a piece of the script text, an indication of the category or basic theme of the story, such as using standard wire service codes, and the title for the script text. Additional windows 142, 143, and 144 associated with the text window 72 may be used to indicate the amount of time from the beginning of the script to a cursor placed somewhere in the text window 72, the reading time of a marked block of text, and the total running time of the entire script text, respectively. All of these values may be calculated using the scanning routine described above.

The editing system of the present invention may also include an editing time line display 150. The editing time line 150 is a graphical representation of the EDL. This display provides a visual reference indicating where, in time, all video and audio edits are placed with respect to each other and to a played-back script. A bit map representation 151 of the first source frame of each edit may be included in the timeline 150. As the video program is replayed by a program editor, a time line scrolls through the time line window 150. A line 152 through the time line window 150 indicates the current position in the script text as the program is being replayed. Thus, as the program is replayed, the timing of the audio and video edits may be observed in the time line window.

The timeline 150 may also be used as a user interface control that permits modification to the edits in the EDL using the computer system mouse. Thus, the timeline 150 may serve as the drop target for a video clip selected in the video window 70 using the drag and drop user interface previously described. Whereas a drop in the text area generates an edit link at the drop location and a corresponding edit in the EDL, a drop in the timeline generates a new edit without a link. Edits without links are not effected by changes in the text script. A user may thus preferably mix linked and non-linked edits to rough cut an edited segment prior to production of the script if necessary. The links to the script text can be added at any time if desired by typing the appropriate control characters, e.g., the edit numbers enclosed in delimiter characters 87, into the script text using the word processor.

Other user controls that may be included in the editing system of the present invention include a user control for adjusting audio levels 160, allowing adjustment of the audio channels, up or down.

It is apparent that the user interfaces and displays described herein, and many others, may be implemented in various manners using conventional programming techniques, to facilitate the use of a text-based video editing system in accordance with the present invention.

It is understood that the invention is not confined to the particular embodiments and applications set forth herein as illustrative, but embraces all forms thereof as come within the scope of the following claims.

What is claimed is:

1. A text based video editing system, comprising:

(a) an editing system computer including an editing system display including a text window and a video window;

(b) a script editor computer program including word processor means for adding and deleting timed text characters to make changes to a script displayed in the text window of the editing system display;

(c) video clip selection means for selecting video clips from a source of video clips and for playing the video clips in the video window of the editing system display;

(d) means for linking the selected video clips and the script text including means for embedding computer readable link control sequence characters into the script text at locations in the text where the video clip is to be located and means for generating a computer readable edit decision list including edits wherein each edit defines a video clip linked to an embedded control sequence in the script text, a starting time for the video clip based on an automatically determined estimated reading time from the beginning of the script text to the location of the embedded control sequence in the script text, and a play time duration of the linked video clip; and (e) means for automatically updating the edit decision list in response to a change in the timed text characters of the script text to maintain synchronization between the video clips defined by the edit decision list edits and the script text, including means for adjusting the starting time of clips defined by edits linked to embedded link control sequences after the change to the text such that the starting times for the video clips defined by the edits are still based on an estimated reading time from the beginning of the script text to the locations of the embedded control sequences in the script text after the chance in the script text.

2. The editing system of claim 1 comprising additionally means for playing the video clips defined by the edit decision list in the video window of the editing system display while simultaneously indicating a point in the script text corresponding to the synchronized video clips being played.

3. The editing system of claim 1 wherein the editing system computer is connected to a source of video clips including an editing server connected to at least one video source.

4. The editing system of claim 1 wherein the editing system computer is connected to a computer network including a network computer for playing back the video clips defined by the edit decision list to an on-air channel.

5. The editing system of claim 1 wherein the video clip selection means includes a database of video clip descriptions and source locations of the video clips described.

6. The editing system of claim 1 wherein the means for updating the edit decision list in response to a change in the script text includes a computer program scanning routine for scanning the timed text characters and embedded control link sequence characters in the script text by reading characters from the beginning of the script text to the end of the script text, including:

(a) means for incrementing a count of timed characters each time a timed text character is read and means for updating a current time from the beginning of the script based on the count of timed characters and a specified reading rate;

(b) means for determining if an edit decision list edit needs to be updated whenever a control link sequence is read including means for comparing the current time from the beginning of the script with a previous calculated time from the beginning of the script text to the embedded control link sequence and means for adjusting the starting time of the video clip as defined by the edit by the difference between the current time and the previous calculated time if the current time and previous calculated time are different.

7. The editing system of claim 6 wherein the means for updating the current time includes means for changing the specified reading rate in response to a reading rate control sequence embedded in the script text.

8. The editing system of claim 6 wherein each embedded computer readable link control sequence defines an entry in an edit link table, wherein each entry in the edit link table contains a reference to an edit in the edit decision list and the previously calculated time from the beginning of the script text to the embedded control link sequence and wherein the means for determining if an edit decision list edit needs to be updated includes means for comparing the current time from the beginning of the script with the previously calculated time contained in the edit link table entry defined by the control link sequence and means for adjusting the starting time of the video clip as defined by the edit by the difference between the current time and the previously calculated time and for setting the previously calculated time in the edit link table to the current time if the current time and previously calculated time are different.

9. The editing system of claim 1 wherein the starting time and play time durations for the video clips defined by the edit decision list edits are measured in frames.

10. The video editing system of claim 9 comprising additionally means for automatically adjusting the play time duration of a video clip defined by an edit linked to an embedded link control sequence immediately preceding the change to the text including means for automatically adjusting the number of frames of the video clip defined by the edit.

11. The video editing system of claim 1 wherein each edit additionally defines a play speed of a video clip linked to an embedded control sequence in the script text and comprising additionally means for automatically adjusting the play time duration of a video clip defined by an edit linked to an embedded link control sequence immediately preceding the change to the text including means for automatically adjusting the play speed of the video clip defined by the edit.

12. The video editing system of claim 1 comprising additionally means for playing the video clips defined by the edit decision list in the video window of the editing system display while simultaneously indicating a point in the script text corresponding to the synchronized video clips being played including means for scrolling the script text through a marquee window on the editing system display while playing the video clips in the video window such that a location in the marquee window indicates the point in the script text corresponding to the synchronized video clip being played.

13. A text based video editing system, comprising:

(a) an editing system computer including an editing system display including a text window and a video window;

(b) a script editor computer program including word processor means for adding and deleting timed text characters to make changes to a script displayed in the text window of the editing system display;

(c) video clip selection means for selecting video clips from a source of video clips and for playing the video clips in the video window of the editing system display;

(d) means for linking the selected video clips and the script text including means for embedding computer readable link control sequence characters into the script text at locations in the text where the video clip is to be located and means for generating a computer readable edit decision list including edits wherein each edit defines a video clip linked to an embedded control sequence in the script text, a starting time for the video clip based on an estimated reading time from the beginning of the script text to the location of the embedded control sequence in the script text, and a play time duration of the linked video clip; and (e) means for updating the edit decision list in response to a change in the script text to maintain synchronization between the video clips defined by the edit decision list edits and the script text, including a computer program scanning routine for scanning the timed text characters and embedded control link sequence characters in the script text by reading characters from the beginning of the script text to the end of the script text, including means for incrementing a count of timed characters each time a timed text character is read and means for updating a current time from the beginning of the script based on the count of timed characters and a specified reading rate and means for determining if an edit decision list edit needs to be updated whenever a control link sequence is read including means for comparing the current time from the beginning of the script with a previously calculated time from the beginning of the script text to the embedded control link sequence and means for adjusting the starting time of the video clip as defined by the edit by the difference between the current time and the previous calculated time if the current time and previously calculated time are different thereby adjusting the starting time of clips defined by edits linked to embedded link control sequences after the change to the text such that the starting times for the video clips defined by the edits are still based on an estimated reading time from the beginning of the script text to the locations of the embedded control sequences in the script text after the change in the script text.

14. The editing system of claim 13 including additionally means for playing the video clips defined by the edit decision list in the video window of the editing system display while simultaneously indicating a point in the script text corresponding to the synchronized video clips being played.

15. The video editing system of claim 14 wherein the means for playing the video clips defined by the edit decision list in the video window of the editing system display while simultaneously indicating a point in the script text corresponding to the synchronized video clips being played includes means for scrolling the script text through a marquee window on the editing system display while playing the video clips in the video window such that a location in the marquee window indicates the point in the script text corresponding to the synchronized video clip being played.

16. The editing system of claim 13 wherein the editing system computer is connected to a source of video clips including an editing server connected to at least one video source.

17. The editing system of claim 13 wherein the editing system computer is connected to a computer network including a network computer for playing back the video clips defined by the edit decision list to an on-air channel.

18. The editing system of claim 13 wherein the video clip selection means includes a database of video clip descriptions and source locations of the video clips described.

19. The editing system of claim 13 wherein the means for updating the current time includes means for changing the specified reading rate in response to a reading rate control sequence embedded in the script text.

20. The editing system of claim 13 wherein each embedded computer readable link control sequence defines an entry in an edit link table, wherein each entry in the edit link table contains a reference to an edit in the edit decision list and the previously calculated time from the beginning of the script text to the embedded control link sequence and wherein the means for determining if an edit decision list edit needs to be updated includes means for comparing the current time from the beginning of the script with the previously calculated time contained in the edit link table entry defined by the control link sequence and means for adjusting the starting time of the video clip as defined by the edit by the difference between the current time and the previously calculated time and for setting the previously calculated time in the edit link table to the current time if the current time and previously calculated time are different.

21. The editing system of claim 13 wherein the starting time and play time durations for the video clips defined by the edit decision list edits are measured in frames.

22. The video editing system of claim 21 comprising additionally means for adjusting the play time duration of a video clip defined by an edit linked to an embedded link control sequence immediately preceding the change to the text including means for adjusting the number of frames of the video clip defined by the edit.

23. The video editing system of claim 13 wherein each edit additionally defines a play speed of a video clip linked to an embedded control sequence in the script text and comprising additionally means for adjusting the play time duration of a video clip defined by an edit linked to an embedded link control sequence immediately preceding the change to the text including means for adjusting the play speed of the video clip defined by the edit.

24. A method for editing a synchronized video and script text program, comprising the steps of:
   (a) editing a script text by adding and deleting timed text characters to a script;
   (b) selecting video clips to be linked to the script text from a source of video clips;
   (c) linking the selected video clips and the script text by embedding computer readable link control sequence characters into the script text at locations in the text where the video clip is to be located; and
   (d) generating a computer readable edit decision list including edits wherein each edit defines a video clip linked to an embedded control sequence in the script text, a starting time for the video clip based on an estimated reading time from the beginning of the script text to the location of the embedded control sequence in the script text, and a play time duration of the linked video clip;
   (e) updating the edit decision list in response to a change in the script text to maintain synchronization between the video clips defined by the edit decision list edits and the script text by scanning the timed text characters and embedded control link sequence characters in the script text by reading characters from the beginning of the script text to the end of the script text, incrementing a count of timed characters each time a timed text character is read, updating a current time from the beginning of the script based on the count of timed characters and a specified reading rate, determining if an edit decision list edit needs to be updated whenever a control link sequence is read by comparing the current time from the beginning of the script with a previously calculated time from the beginning of the script text to the embedded control link sequence and adjusting the starting time of the video clip as defined by the edit by the difference between the current time and the previously calculated time if the current time and starting time are different thereby adjusting the starting time of clips defined by edits linked to embedded link control sequences after the change to the text such that the starting times for the video clips defined by the edits are still based on an estimated reading time from the beginning of the script text to the locations of the embedded control sequences in the script text after the change in the script text.

25. The method of claim 24 comprising additionally the steps of playing the video clips defined by the edit decision list while simultaneously indicating a point in the script text corresponding to the synchronized video clips being played.

26. The method of claim 24 wherein the step of selecting video clips includes the step of selecting video clips from a database of video clip descriptions and source locations of the video clips described.

27. The method of claim 24 wherein the step of updating the current time from the beginning of the script includes the step of changing the specified reading rate in response to a reading rate control sequence embedded in the script text.

28. The method of claim 24 wherein each embedded computer readable link control sequence defines an entry in an edit link table, wherein each entry in the edit link table contains a reference to an edit in the edit decision list and the previously calculated time from the beginning of the script text to the embedded control link sequence and wherein the step of determining if an edit decision list edit needs to be updated includes the steps of comparing the current time from the beginning of the script with previously calculated time contained in the edit link table entry defined by the control link sequence and adjusting the starting time of the video clip as defined by the edit by the difference between the current time and the previously calculated time and for setting the previously calculated time in the edit link table to the current time if the current time and previously calculated time are different.

29. The method of claim 24 comprising additionally the step of adjusting the play time duration of a video clip defined by an edit linked to an embedded link control sequence immediately preceding the change to the text including the step of adjusting a number of frames of the video clip defined by the edit.

30. The method of claim 24 comprising additionally the step of adjusting the play time duration of a video clip defined by an edit linked to an embedded link control sequence immediately preceding the change to the text including the step of adjusting the play speed of the video clip defined by the edit.

31. The method of claim 24 comprising additionally the step of playing the video clips defined by the edit decision list on an on-air channel.

32. A method for linking a video clip to a text script including timed text characters in a computer based video editing system, comprising the steps of:
   (a) marking a block of text in the text script to define a text block starting location and a text block ending location;
   (b) selecting a source frame from a video clip including a plurality of frames;
   (c) linking the video clip to the text script by designating a location within the marked block of text as the location of the source frame and placing a computer readable control link sequence of characters in the text at the designated location;
   (d) calculating a first reading time from a beginning of the script text to the text block starting location;
   (e) calculating a second reading time from the beginning of the script text to the designated location;
   (f) calculating a third reading time from the beginning of the script text to the text block ending location;
   (g) determining a starting frame of the video clip by a number of frames from the source frame corresponding to the difference between the second calculated reading time to the designated location and the first calculated reading time to the text block starting location;
   (h) determining a duration of the video clip by the difference between the first calculated reading time to the text block starting location and the third calculated reading time to the text block ending location;
   (i) determining a starting time for the video clip as the first calculated reading time to the text block starting location; and
   (j) creating an edit in a computer readable edit decision list, the edit including a link to the computer readable control link sequence in the text, and values corresponding to the starting frame, duration, and starting time of the video clip.

33. The method of claim 32 wherein the steps of calculating the first, second, and third reading times include the steps of:
   (a) reading characters from the beginning of the script text to the text block starting location, the designated location, and the text block ending location;

(b) incrementing a count of timed characters each time a timed text character is read;

(c) updating a current time from the beginning of the script based on the count of timed characters and a specified reading rate; and (d) setting the first reading time to the current time at the text block starting location, setting the second reading time to the current time at the designated location, and setting the third reading time to the current time at the text block ending location.

34. The method of claim 33 wherein the step of updating the current time from the beginning of the script includes the step of changing the specified reading rate in response to a reading rate control sequence embedded in the script text.

35. The method of claim 32 comprising additionally the step of creating an entry in an edit link table, the entry in the edit link table being linked to the control link sequence and containing a reference to the edit in the edit decision list and a value corresponding to the second calculated reading time from the beginning of the text to the designated location.

36. The method of claim 35 comprising additionally the step of updating the edit decision list in response to a change in the script text before the designated location to maintain synchronization between the video clip defined by the edit decision list edit and the script text, including the steps of:

(a) scanning the timed text characters and embedded control link sequence characters in the script text by reading characters from the beginning of the script text to the end of the script text;

(b) incrementing a count of timed characters each time a timed text character is read;

(c) updating a current time from the beginning of the script based on the count of timed characters and a specified reading rate;

(d) comparing the current time from the beginning of the script text to the designated location of the control link sequence after the change in the script text with the value in the edit link table entry linked to the control link sequence corresponding to the previously calculated reading time from the beginning of the script text to the designated location;

(e) adjusting the starting time value in the edit referenced by the edit link table entry by the difference between the current time and the previously calculated reading time such that the starting time for the video clip is still based on a calculated reading time from the beginning of the script to the designated location of the control link sequence; and (f) setting the value in the edit link table entry corresponding to the previously calculated reading time to the current time.

37. The method of claim 36 wherein the step of updating the current time from the beginning of the script includes the step of changing the specified reading rate in response to a reading rate control sequence embedded in the script text.

* * * * *